US007498578B2

(12) United States Patent
Scheuer et al.

(10) Patent No.: US 7,498,578 B2

(45) Date of Patent: Mar. 3, 2009

(54) METHOD AND SYSTEM FOR CALIBRATING A REFLECTION INFRARED DENSITOMETER IN A DIGITAL IMAGE REPRODUCTION MACHINE

(75) Inventors: Mark A. Scheuer, Williamson, NY (US); Patricia J. Donaldson, Pittsford, NY (US); Douglas A. Kreckel, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 991 days.

(21) Appl. No.: 10/899,810

(22) Filed: Jul. 27, 2004

(65) Prior Publication Data

US 2006/0024077 A1 Feb. 2, 2006

(51) Int. Cl.
*G01J 5/02* (2006.01)
*G01V 8/00* (2006.01)
*G01N 21/55* (2006.01)
*G03G 15/00* (2006.01)

(52) U.S. Cl. .............. 250/341.8; 250/341.5; 250/559.1; 356/445; 399/74

(58) Field of Classification Search .............. 250/208.1, 250/559.1, 559.07, 559.17, 358.1, 341.8; 399/74, 49; 356/445, 446; 347/137–140, 347/105

See application file for complete search history.

(56) References Cited

U.S. PATENT DOCUMENTS

| | | | | |
|---|---|---|---|---|
| 4,553,033 | A * | 11/1985 | Hubble et al. | 250/353 |
| 5,053,822 | A * | 10/1991 | Butler | 399/74 |
| 5,162,874 | A * | 11/1992 | Butler | 356/446 |
| 5,204,538 | A * | 4/1993 | Genovese | 250/559.07 |
| 5,386,276 | A * | 1/1995 | Swales et al. | 399/8 |
| 6,047,142 | A | 4/2000 | Donaldson | |
| 6,462,821 | B1 | 10/2002 | Borton et al. | |
| 2003/0132372 | A1 | 7/2003 | Lofthus et al. | |

* cited by examiner

*Primary Examiner*—Stephen Yam
*Assistant Examiner*—Jennifer Bennett
(74) *Attorney, Agent, or Firm*—Maginot, Moore & Beck LLP

(57) ABSTRACT

An enhanced toner area coverage (ETAC) sensor may be calibrated to adjust for changes in LED intensity by determining a functional relationship between specular developed mass per unit area (DMA) values and diffuse readings obtained from the sensor. Specular and diffuse readings are obtained from an ETAC sensor that senses reflected light from toner patches generated with incrementally increasing densities on the photoreceptor belt. The specular readings in a particular range and their corresponding diffuse readings are selected for the calibration computations. Reflected ratios are computed from the specular readings and used to determine specular DMAs. The specular DMAs and selected diffuse readings define a set of points for which a functional relationship is determined.

17 Claims, 5 Drawing Sheets

METHOD AND SYSTEM FOR CALIBRATING A REFLECTION INFRARED DENSITOMETER IN A DIGITAL IMAGE REPRODUCTION MACHINE

FIELD OF THE INVENTION

The present invention relates generally to digital document production systems, and more particularly, to digital document production systems that use reflection infrared densitometers to monitor and control the document reproduction process.

BACKGROUND OF THE INVENTION

Digital document reproduction systems are well-known. These systems typically include a digital document generator that may be coupled to the reproduction system directly or through a computer network. Digital document generators include computers, scanners, or other devices that store or permit a user to define content for a digital document. The digital data are provided to a print engine so the controller of the engine may control the process. The reproduction system also includes a photoreceptor belt or drum that provides a rotating surface for the development and transfer of a latent image that corresponds to the digital document.

The latent image development begins with the charging of a portion of the photoreceptor belt at a charging station. The charged portion of the belt is advanced through an imaging/exposure station, where the data digital is provided as a signal to a raster output scanner. The raster output scanner selectively discharges the charged portion of the photoreceptor belt to form the latent image in correspondence with the document digital data. The photoreceptor belt then advances to a development station where toner is attracted to the latent image. More than one development station may be used for the development of color images so that different color toner materials may be applied to the latent image. Once the latent image is developed, the belt rotates to a transfer station where the toner on the latent image contacts a support sheet material, such as a sheet of paper. Typically, a corona generating device generates a charge on the backside of the support material so the toner particles are attracted to the support material and migrate from the latent image to the support material. A detack unit removes the support material from the photoreceptor belt and the belt moves through a cleaning station to remove the residual toner particles so that portion of the belt may be used for development of another latent image. The support sheet impregnated with toner particles moves to a fuser station where fuser and pressure rollers permanently fuse the toner particles to the support material. The support material sheet is then directed to a catch tray for the accumulation of support sheets bearing the images of the digital documents sent to the reproduction system.

To provide data for the control of this reproduction process, one or more densitometers or enhanced toner area coverage (ETAC) sensors may be provided after the development station(s) to measure the developed mass of toner applied to a unit area, sometimes called developed mass per unit area (DMA), on the photoreceptor belt or drum. The ETAC sensor includes one or more light emitting diodes (LEDs) for emitting light at a particular wavelength, which is preferably in the infrared range. The LEDs of the ETAC sensor are oriented at a particular angle with respect to the photoreceptor belt so that the emitted light is reflected by the toner on the photoreceptor belt and one or more photodetectors are located at the reflection angle to receive the light reflected from the photoreceptor belt. Typically, the latent image includes a toner control patch so the emitted light impinges on an area having toner to produce the toner density measurements. The voltage signal generated by a photodetector may be used to determine the DMA for the application of toner to the photoreceptor belt or drum.

The photodetectors are located in the area of reflected light so that one or more of the photodetectors receive specular light reflected from the photoreceptor. Other photodetectors are located so that they receive diffuse light reflected from the applied toner. The photodetectors generate a voltage signal that corresponds to the amount of light received by the photodetector. Thus, the photodetectors provide a specular measurement and a diffuse measurement. The specular measurement refers to light reflected by bare photoreceptor within the toner patch that presents a mirror surface to the emitted light, while the diffuse measurement refers to light reflected by the toner patch that is uneven and diffuses the emitted light from the LEDs. Both signals are important for reproduction control because the specular measurement is self-calibrating with LED intensity variations but saturates at typical solid area masses while the diffuse measurement remains sensitive to toner mass as it increases but is altered by LED intensity variations. Consequently, the specular signal has good signal to noise ratio characteristics for low DMA levels, while the diffuse signal has good signal to noise ratio characteristics for high DMA levels.

The controller of a digital reproduction system uses the specular and diffuse measurements received from the ETAC sensors to maintain image quality. In response to the detection of small amounts of toner dirt on the lens of a LED in an ETAC sensor or reflectance changes in the photoreceptor belt, the controller may increase the intensity of the LED in an ETAC sensor. However, the increase in LED intensity alters the diffuse signals and the DMA measurements obtained from an ETAC sensor. Because DMA measurements are critical for maintaining image quality, adjustments to the intensity of a LED in an ETAC sensor alter the DMA measurements derived from the ETAC sensor signals. Thus, the controller's regulation of DMA may become too inaccurate for acceptable image quality.

SUMMARY OF THE INVENTION

The present invention addresses the need for accurate DMA measurements using ETAC sensor signals by providing an ETAC calibration method that may be executed whenever the intensity of a LED in an ETAC sensor is altered. The calibration method includes generating a series of image panels with toner patches of incrementally increasing densities on a photoreceptor medium, obtaining specular readings and diffuse readings for light reflected from the photoreceptor medium and the toner patches, computing specular developed mass per unit area values, and determining a functional relationship between the specular DMAs and the diffuse readings so that the coefficients of the functional relationship may be used to later determine diffuse DMAs for a reproduction system. Because specular readings saturate as the developed mass increases and as it nears zero, the method also includes comparing the specular readings to a specular threshold and selecting the specular readings that are within the specular threshold and their corresponding diffuse readings for the functional relationship determination. The specular threshold may include an upper specular threshold and a lower specular threshold and only those specular readings between the upper and the lower specular thresholds and their corresponding diffuse readings are used for determining the functional relationship.

The generation of image panels also includes charging the photoreceptor medium to a voltage above the charging voltage used in reproduction operations for the digital reproduction system. In one embodiment of the present invention, a photoreceptor belt is charged to a voltage of about 800 volts. Charging the photoreceptor medium to a higher voltage expands the density range over which specular readings may be obtained for determining a functional relationship. The generation of the toner patches in the image panels includes changing pixel patterns for forming the latent images so that the toner patches increase in DMA for successive image panels. Alternatively, the generation of the toner patches in the image panels may include increasing a bias voltage on a developer unit to increase the range of densities for the toner patches.

Determination of the functional relationship between the specular DMAs and the diffuse readings may be performed by determining coefficients for a linear or a non-linear functional relationship. The specular DMAs computation includes computing a reflected ratio of a difference between a specular reading and a solid toner patch specular reading to a difference between a specular reading for a clean photoreceptor medium and the solid toner patch specular reading. The reflected ratios are used to compute the specular DMAs that are paired with diffuse readings to define a set of points for a functional relationship fit. A linear regression analysis is used in one embodiment of the present invention to determine a slope and an offset. In another embodiment, coefficients of a quadratic functional relationship are determined from the set of points defined by the specular DMAs and diffuse readings. The quadratic functional relationship of this embodiment includes a square root term. Once the functional relationship is obtained, the coefficients of the equation describing the relationship may be used to compute diffuse DMA values from diffuse readings. For a linear relationship, the slope and the offset for the linear functional relationship are used for computing diffuse DMA values. For a quadratic relationship, the constant is assumed to be zero so that the coefficient for the squared and linear term may be determined and used for such a computation.

The calibration method of the present invention may be implemented with a system comprised of a raster output scanner (ROS) for generating a series of image panels with toner patches having incrementally increasing densities on a photoreceptor medium, an enhanced toner area coverage sensor for obtaining specular readings and diffuse readings for light reflected from the photoreceptor medium and the toner patches, and a controller for computing specular developed mass per unit area (DMA) values and determining a linear relationship between the specular DMAs and the diffuse readings so that the coefficients of the functional relationship may be used to later determine diffuse DMAs for a digitial reproduction system. The developed mass for the toner patches may be varied by changing the pixel pattern for the toner patches or by generating a solid toner patch and varying the bias voltage at the developer. Because specular readings saturate as the developed mass increases and as it nears zero, the controller may also compare each specular reading to a specular threshold and select only the specular readings within the specular threshold and their corresponding diffuse readings.

The system may also include a charger for generating image panels by charging the photoreceptor medium to a voltage that is higher than a voltage used for reproduction operations. In one embodiment of such a system, the charger charges the photoreceptor to a voltage of about 800 volts to extend the density range for the toner patches in the image panels. This embodiment may also include a developer unit that increases its bias voltage to incrementally increase densities for the toner patches in the image panels. Alternatively, the ROS may generate latent images for the toner patches in the image panels with varying pixel patterns so that the toner patches increase in density for successive image panels.

The controller of the system may determine the coefficients for a linear or a non-linear functional relationship between the specular DMAs and the diffuse readings. The controller computes a reflected ratio of a difference between a specular reading and a solid toner patch specular reading to a difference between a specular reading for a clean photoreceptor medium and the solid toner patch specular reading. The reflected ratios are used by the controller to compute the specular DMAs that are paired with diffuse readings to define a set of points for a functional relationship determination. A linear regression analysis is used in one embodiment of the present invention to determine a slope and an offset, although other linear fitting methods may be used as well. In another embodiment, the controller determines the coefficients of a square root term and a linear term in a quadratic functional relationship. Once the coefficients of the functional relationship are determined, the controller stores the coefficients in a memory for later computation of diffuse DMA values from diffuse readings.

The above described features and advantages, as well as others, will become more readily apparent to those of ordinary skill in the art by reference to the following detailed description and accompanying drawings.

DETAILED DESCRIPTION

Figure 1:
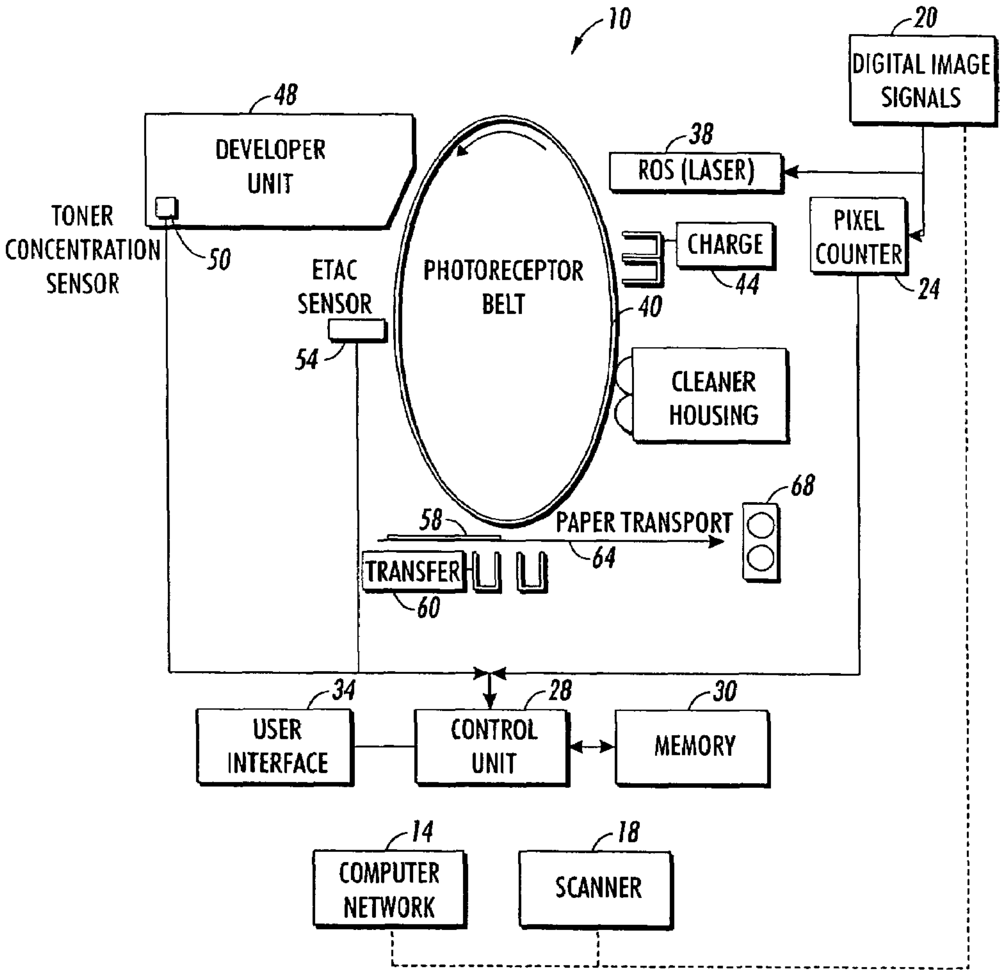
FIG. 1 shows a block diagram of a digital document reproduction system in which the calibration method of the present invention may be used.

FIG. 1 shows a digital document reproduction system in which the calibration of the present invention may be used. The system 10 may include a computer network 14 through which digital documents are received from computers, scanners, and other digital document generators. Also, digital document generators, such as scanner 18, may be coupled to the digital image receiver 20. The data of the digital document images are provided to a pixel counter 24 that is also coupled to a controller 28 having a memory 30 and a user interface 34. The digital document image data is also used to drive the raster output scanner 38. The photoreceptor belt 40 rotates in the direction shown in FIG. 1 for the development of the latent image and the transfer of toner from the latent image to the support material.

To generate a hard copy of a digital document, the photoreceptor belt is charged using corona discharger 44 and then exposed to the ROS 38 to form a latent image on the photoreceptor belt 40. Toner is applied to the latent image from developer unit 48. Signals from toner concentration sensor 50 and ETAC sensor 54 are used by the controller 28 to determine the DMA for images being developed by the system 10. The toner applied to the latent image is transferred to a sheet of support material 58 at transfer station 60 by electrically charging the backside of the sheet 58. The sheet is moved by paper transport 64 to fuser 68 so that the toner is permanently affixed to the sheet 58.

Figure 2:
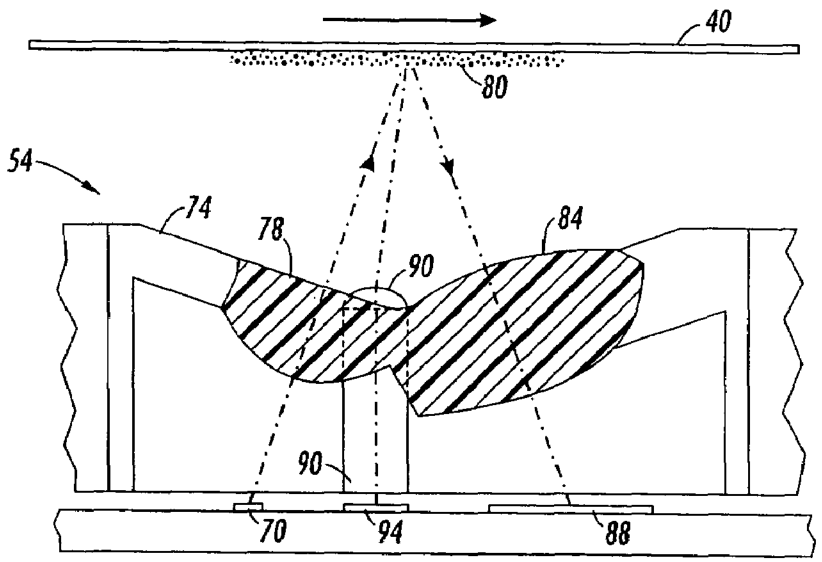
FIG. 2 is a partial side view of an ETAC sensor that may be calibrated by the calibration method of the present invention.

The ETAC sensor 54 shown in FIG. 1 may be an ETAC sensor, such as the one disclosed in U.S. Pat. No. 6,462,821, commonly assigned to the assignee of this application, the disclosure of which is hereby incorporated in this application in its entirety. As shown in FIG. 2, the ETAC sensor may include a LED 70 located within the sensor housing 74. Mounted in the wall of the housing 74 is a lens 78 for collimating the light emitted from LED 70. Emitted light is reflected from toner patch 80 and collected by lens 84 for photodetector 88. Photodetector 88 is centrally located so the light from LED 70 to photodetector 88 is specular reflected light. Laterally offset from the center line between LED 70 and phtotodetector 88 is a small diameter lenslet 90 for directing reflected light to photodetector 94. This structure enables photodetector 94 to measure the diffuse signal from light reflected by toner patch 80. In the ETAC sensor 54, the LED 70 may be a 940 nm infrared LED emitter and the photodetectors 88 and 94 may be commercially available PIN or PN photodiodes.

The signals from the photodetectors 88 and 94 are used in a known manner by the controller 28 to determine a DMA for a toner patch on the photoreceptor belt 40. In response to the detection of toner dirt on the lens 84 or a change in the reflectance of photoreceptor belt 40, the controller 28 may change the intensity of the LED 70. However, once the intensity of the LED 70 is changed, the diffuse signals from photodetector 94 are also altered because the magnitude of the diffuse signals varies with LED intensity. That is, the diffuse signal measurement changes in response to the LED intensity change, as well as the DMA being determined, even though the amount of toner has not changed. Calibration of the ETAC sensor 54 would enable the controller 28 to determine the offset in the diffuse signal attributable to the LED intensity change over its range of operation. Thereafter, the DMA could be determined accurately at the new LED intensity level.

Figure 3A:
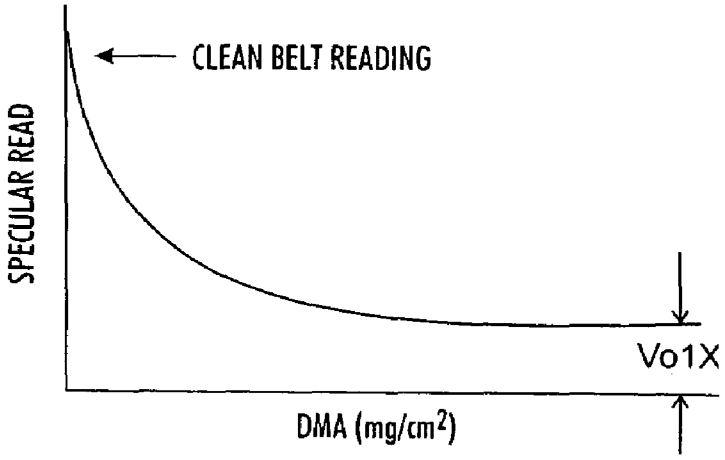
FIG. 3A depicts the graphical relationship between specular measurements received from an ETAC sensor and DMA values.

As shown in FIG. 3A, the specular signals generated by the photodetector 88 reach the maximum response of the sensor when DMA=0, that is, when light reflected from a clean photoreceptor belt portion is being received. At system initialization, the LED intensity is adjusted so that a specular signal value for a clean belt reading is between 4.3 volts to 4.6 volts out of a maximum of 5 volts. This range of operation maximizes the overall range of the ETAC sensor. In response to reflectance changes in belt 40 or toner dirt on the lens 78, 84, or 90, the LED intensity is changed by the controller 28. To recalibrate the ETAC sensor, the specular value for a clean belt reading is measured. Also, the voltage generated by the ETAC sensor in response to a solid toner patch is stored as the saturation or offset voltage, $V_{solid\_toner}$.

The intensity of the LED does not affect the reflected ratio of the specular signal generated at the clean photoreceptor belt to the specular signal generated by an area having toner. This ratio may be described in an equation as:

$$\text{Reflected Ratio}=(V_{specular}-V_{solid\_toner})/(V_{clean\_belt}-V_{solid\_toner})$$

Figure 3B:
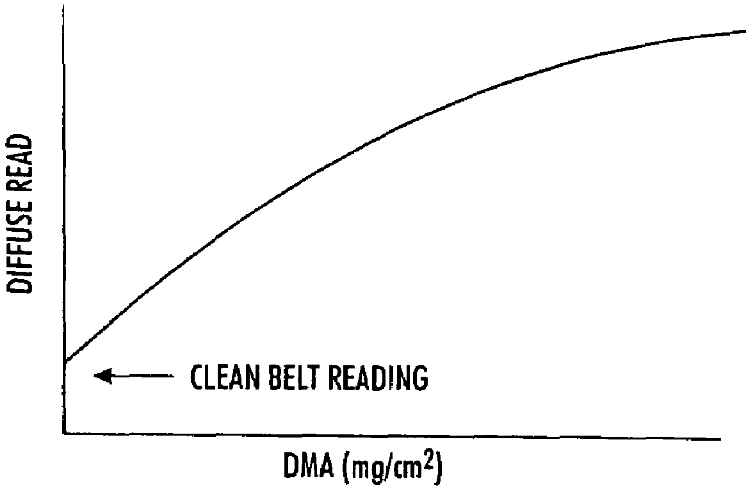
FIG. 3B depicts the graphical relationship between diffuse measurements received from an ETAC sensor and DMA values.

The diffuse signal is related to DMA as graphically depicted in FIG. 3B. As seen in the figure, the diffuse signal is linear for DMA values from a clean belt reading up to about 0.7 mg/cm$^2$ and then it becomes quadratic for higher DMA values. This relationship may be linearly described by the equation:

$$DMA=\text{slope}(V_{diffuse}-V_{clean\_belt})+\text{Offset}$$

While the accuracy of the linear fit is adequate for most single-color applications, the eye's sensitivity to color variation may require a more accurate determination of DMA in full-color products. The DMA accuracy can be increased further by using a square root in place of the offset. This relationship may be described by the equation:

$$DMA=\text{slope}(V_{diffuse}-V_{clean\_belt})+\text{coefficient}(V_{diffuse}-V_{clean\_belt})^{1/2}+\text{constant}.$$

The coefficients in either equation may be determined by obtaining specular and diffuse readings for a series of toner patches having varying toner particle densities. The densities may be varied by sweeping the development voltage over its range. Adjusting the range of the development bias voltage so that the DMAs of the toner patches substantially covers the linear response area of the specular readings helps improve the accuracy of the functional relationship fit to the collected data points. One way in which a minimum development bias voltage and corresponding minimum DMA toner patch is established is to set the charge voltage to a higher voltage than typically used in reproduction operations. This increase in charge voltage enables the ROS exposure voltage to be increased. These increases in the charge and ROS exposure voltages enable the developer voltage range to be extended beyond its typical operational range. Because $V_{dev}=V_{mag}-V_{exposure}$, where $V_{mag}$ is the voltage delivered by the power supply to the developer housing for generation of the development voltage, the developer bias voltage range is decreased at its high and low ends. That is, $V_{mag}$ does not change but $V_{exposure}$ is increased so the low end of the range for $V_{dev}$ is lowered. This shift enables specular readings for toner patches having smaller DMAs to be obtained. Thus, more data points may be collected than would otherwise be available if the typical $V_{exposure}$ were used. However, a corresponding change in the charger voltage is required for the generation of the latent images for the toner patches.

For one type of xerographic reproduction machine, the charger 44 is set to impart a voltage of about 800 V to the photoreceptor belt. This enables the exposure voltage of the ROS to be set to a value in the range of 150-180V. These adjustments to the charging voltage and the exposure voltage enable the development bias voltage to be swept through the range of −98 to 450V, assuming a ROS exposure voltage of 150V and the available bias voltage for generation of the developer voltage is from 52V to 600V, since $V_{dev}=V_{mag}-V_{exposure}$. $V_{mag}$ is the bias voltage delivered by the power supply to the developer housing for generation of the development voltage. The ROS 38 forms toner patches in an image panel that correspond to a pixel pattern received from the controller 28. The pixel pattern may remain constant while the developer bias voltage is swept through its range to generate toner patches of increasing densities. That is, for successive image panels, the toner patches correspond to the developer bias as it is incrementally increased to about 600V for the successive image panels until the last image panel in the calibration series is developed. Alternatively, the pixel pattern may be varied to incrementally increase the densities of the toner patches.

The incrementally increasing densities of the toner patches in the image panel series are used to obtain specular and diffuse reading from the ETAC sensor. The reflected ratio for each specular reading is computed and compared to a lower and an upper specular threshold. For example, a lower specular threshold of about 0.2 and a upper specular threshold of about 0.9 may be used to select the specular signals having values that are neither too light nor too dark. The DMA values corresponding to these selected specular signals may be computed using the equation that defines the curve in FIG. 3B. This curve is sensitive to toner chemical composition and size distribution. In one implementation, the functional form of the equation is:

$$\text{specular } ETAC\ DMA = \ln(1-\ln(\text{specular reflected ratio}/1.375)/2.9)$$

The computed specular DMA values and the diffuse readings are used to define points and the functional relationship that best fits the defined points is determined. Using linear regression analysis, the linear relationship may be solved as:

n=number of selected readings;

$$s_{diff} = \sum (V_{diffuse} - V_{\text{clean\_belt}});$$

$$s_{DMA} = \sum \text{specular } DMA \text{ values};$$

$$\text{slope} = \frac{\sum [(V_{diffuse} - V_{Cleanbelt}) \cdot spec\ ETAC\ DMA] - \left(\frac{sdiff \cdot sDMA}{n}\right)}{[\sum (V_{diffuse} - V_{Cleanbelt})^2] - sdiff^2/n}$$

$$\text{offset} = (sDMA - \text{slope} \cdot sdiff)/n$$

Figure 4:
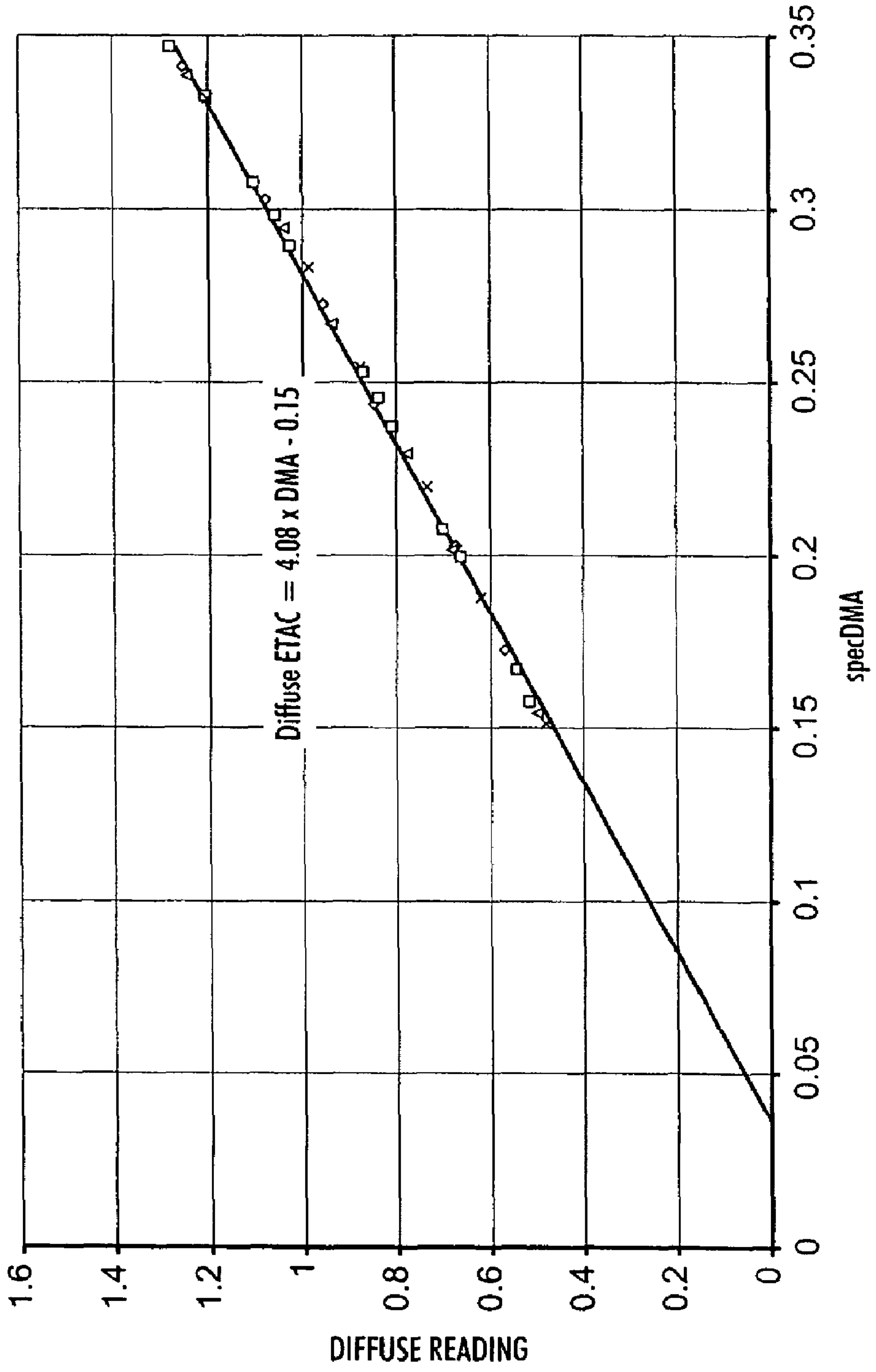
FIG. 4 is a graphical depiction of a set of points obtained during an calibration procedure and the linear fit obtained for the set of points.

Using the offset and the slope, the diffuse readings may be adjusted so that more accurate DMA values are determined for image quality regulation. Specifically, the linear relationship between the diffuse reading, the clean belt reading, the slope, and the offset is used to determine the appropriate DMA measurement. The controller 28 uses this DMA value to control image quality in a known manner. An experimental result showing this result is depicted in FIG. 4.

Using multiple linear regression analysis, the coefficients of the equation set out above that contains a square root term may be solved as:

$$S_2 = \sum (V_{diffuse} - V_{cleanbelt})^2$$

$$S_{3/2} = \sum (V_{diffuse} - V_{cleanbelt})^{3/2}$$

$$S_1 = \sum (V_{diffuse} - V_{cleanbelt})$$

$$S_0 = \sum \left(\sqrt{(V_{diffuse} - V_{cleanbelt})} \cdot spec\ ETAC\ DMA\right)$$

$$S_{xy} = \sum ((V_{diffuse} - V_{cleanbelt}) \cdot spec\ ETAC\ DMA)$$

$$\text{coefficient} = \frac{S_0 S_2 - S_{xy} S_{3/2}}{S_1 S_2 - (S_{3/2})^2}$$

$$\text{slope} = \frac{S_{xy} - S_{3/2} \cdot \text{coefficient}}{S_2}$$

Figure 5:
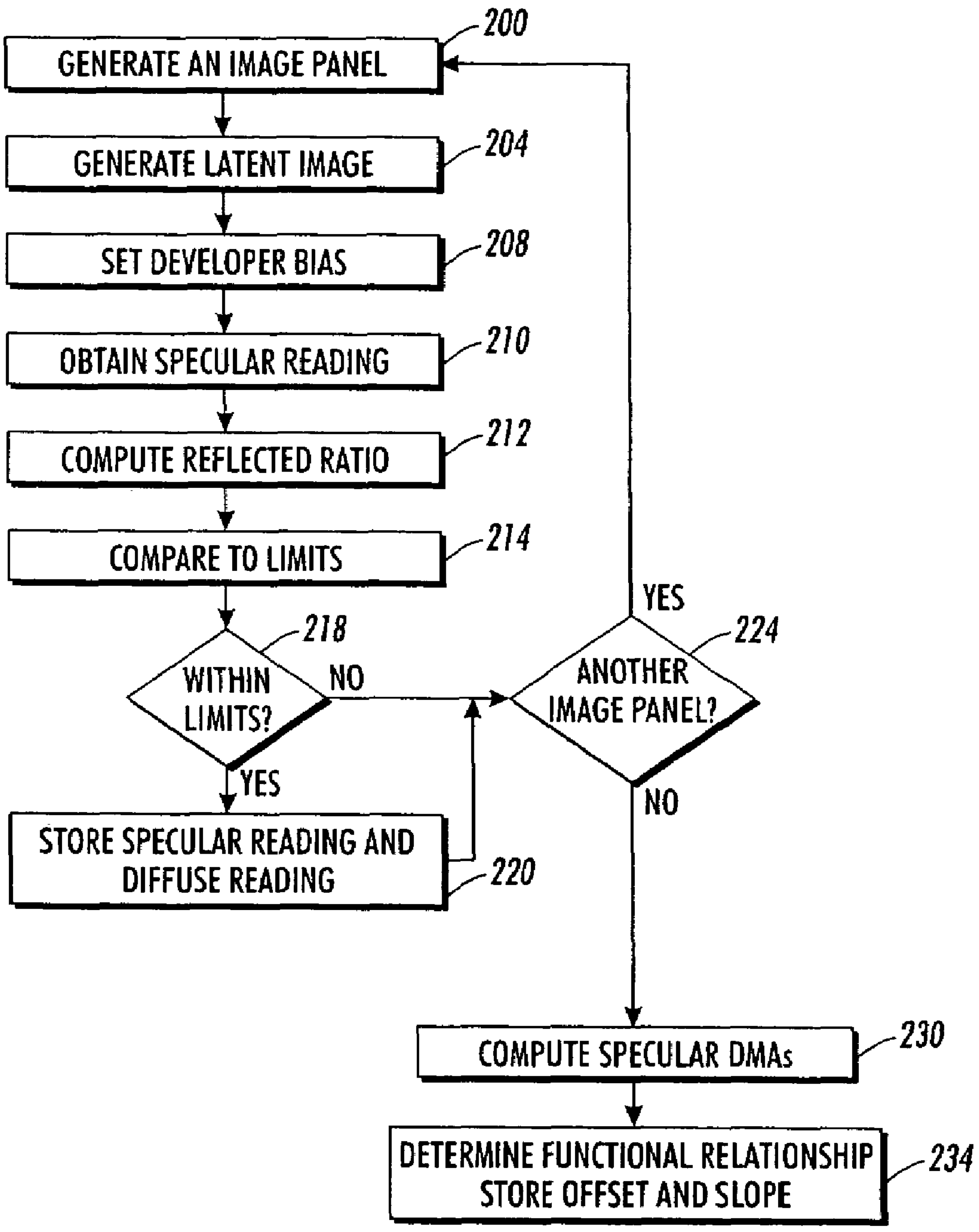
FIG. 5 is a flowchart of a method for performing the calibration in accordance with the principles of the present invention.

A method of calibrating the ETAC sensor 54 is shown in FIG. 5. The method includes charging a portion of the photoreceptor to generate an image panel (block 200). This voltage may be increased to a voltage than its typical operating range as discussed above. Within a generated image panel, one or more latent images for toner patches are formed (block 204). The ROS exposure voltage may also be increased so the developer bias voltage may be used to develop toner patches with smaller DMAs and extend the range of the specular readings. The bias of the developer unit is set (block 208) so toner is applied to the latent image in proximity to the developer unit. A specular reading is obtained (block 210). The specular reflectance ratio is computed (block 212) and compared to the specular thresholds (block 214). If it is within the specular thresholds (block 218), the specular reading and the diffuse reading are stored (block 220). If the specular reflected ratio is not within the specular thresholds, the specular and diffuse readings are not used in the calibration. The process of collecting data continues until all the image panels of a series of toner patches having different DMA masses are generated, developed, and measured (block 224). The toner patches having different developed masses may be generated by changing the pixel pattern in an image panel (block 200) or by varying the developer voltage for the same solid toner patch pattern (block 208). The specular DMAs are computed (block 230) and the functional relationship between the specular DMAs and the corresponding diffuse DMAs is determined (block 234). The determination of the functional relationship may be performed by one of the linear regression analyses discussed above or some other known method.

A system for implementing the method of the present invention includes the controller 28 and programmed instructions for performing the method. Under the programmed operation of controller 28, the charger is set to a voltage for forming image panels that provides good signal to noise ratios for the calibration process. The controller regulates the process to generate different developed masses for toner patches in image panels. The series of varying toner patches may be generated with different pixel patterns for toner patches used to form the latent images used in the calibration process or by operating the developer unit with different bias voltages for each image panel. The controller obtains the specular readings, determines whether they are within the specular thresholds, and stores the specular and diffuse readings for the selected specular readings. Determination of the functional relationship between the specular and diffuse readings is performed using a known methodology. Thereafter, the controller 28 may use the coefficients for the determined functional relationship to adjust diffuse readings using the coefficients obtained from the calibration process. For a linear functional relationship, the determined coefficients correspond to the linear and offset terms of a linear equation. For a quadratic functional relationship, the determined coefficients correspond to the square root and linear terms as the constant term is assumed to be zero.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for calibrating a densitometer in a digital reproduction system including:

generating a series of image panels with toner patches of incrementally increasing densities on a photoreceptor medium, obtaining specular readings and diffuse readings for light reflected from the photoreceptor medium and the toner patches, computing specular developed mass per unit area (DMA) values with reference to a reflected ratio of a difference between each specular reading and a solid toner patch specular reading to a difference between a specular reading for a clean photoreceptor medium and the solid toner patch specular reading; and determining a functional relationship between the computed specular DMA values and the diffuse readings corresponding to the specular readings used to compute the specular DMA values so that coefficients of the functional relationship may be used to later determine diffuse DMA values for a reproduction system.

2. The method of claim 1 also including:

comparing the specular readings to a specular threshold; and selecting the specular readings that are at or below the specular threshold for the reflected ratio computations.

3. The method of claim 1, the generation of the toner patches in the image panels including:

charging the photoreceptor medium to a voltage above the charging voltage used in reproduction operations.

4. The method of claim 1, the generation of the toner patches in the image panels including:

changing pixel patterns for forming latent images of the toner patches so that the toner patches increase in DMA for successive image panels.

5. The method of claim 3, the generation of the toner patches in the image panels including:

increasing a bias voltage on a developer unit to increase the range of densities for the toner patches.

6. The method of claim 1, wherein the determination of the functional relationship between the specular DMA values and the diffuse readings that correspond to the specular readings from which the reflected ratios were computed further includes:

performing an analysis on a set of points defined by the specular DMA values and the diffuse readings corresponding to the specular readings used for the computation of the reflected ratios to determine coefficients for a quadratic functional relationship.

7. The method of claim 6 wherein the quadratic functional relationship includes a square root term.

8. The method of claim 1, wherein the determination of the functional relationship between the specular DMA values and the diffuse readings that correspond to the specular readings from which the reflected ratios were computed further includes:

performing a linear regression analysis on a set of points defined by the specular DMA values and the diffuse readings corresponding to the specular readings used for the computation of the reflected ratios.

9. A system for calibrating an enhanced toner area coverage (ETAC) sensor comprising:

a raster output scanner (ROS) for generating a series of image panels with toner patches having incrementally increasing densities on a photoreceptor medium;

an enhanced toner area coverage sensor for obtaining specular readings and diffuse readings for light reflected from the photoreceptor medium and the toner patches; and a controller configured to compute specular developed mass per unit area (DMA) values with reference to a reflected ratio of a difference between each specular reading and a solid toner patch specular reading to a difference between a specular reading for a clean photoreceptor medium and a solid toner patch specular reading and to determine a functional relationship between the specular DMA values for which a reflected ratio was computed and the diffuse readings corresponding to the specular readings for which a reflected ratio was computed so that coefficients of the functional relationship may be used to later determine diffuse DMA values for a reproduction system.

10. The system of claim 9 wherein the controller compares each specular reading to a specular threshold and selects only the specular readings at or below the specular threshold for computation of the reflected ratios.

11. The system of claim 9 further comprising:

a charger for generating image panels by charging the photoreceptor medium to a voltage that is higher than a voltage used for reproduction operations.

12. The system of claim 9 wherein the ROS generates latent images for the toner patches in the image panels with varying pixel patterns so that the toner patches increase in density for successive image panels.

13. The system of claim 11 further comprising:

a developer unit that increases its bias voltage to incrementally increase densities for the toner patches in the image panels.

14. The system of claim 9 wherein the controller determines the functional relationship between the specular DMA values and the diffuse readings using a linear regression analysis.

15. The system of claim 9 wherein the controller determines the functional relationship between the specular DMA values and their corresponding diffuse readings by determining coefficients in a quadratic functional relationship.

16. A method for calibrating a densitometer in a digital reproduction system including:

charging a photoreceptor medium to a charging voltage that is greater than a charging voltage used in a reproduction operation of a digital reproduction system;

exposing the photoreceptor medium to an exposure voltage that generates toner patches in a series of image panels, the toner patches having densities over a density range that is greater than the density range used in the reproduction operation of the digital reproduction system, obtaining specular readings and diffuse readings for light reflected from the photoreceptor medium and the toner patches, computing reflected ratios for the specular readings;

determining specular developed mass per unit area (DMA) values from the computed reflected ratios; and determining coefficients for a quadratic functional relationship that corresponds to the determined specular DMA values and the diffuse readings so that coefficients of the functional relationship may be used to later determine DMA values for a reproduction system.

17. The method of claim 16 also including:

comparing each specular reading to a pair of specular thresholds; and selecting the specular readings between the specular thresholds for the computation of the reflected ratios and their corresponding diffuse readings for use in the functional relationship determination.

* * * * *